United States Patent

Bergk

[11] Patent Number: 6,014,321
[45] Date of Patent: Jan. 11, 2000

[54] ELECTRONIC SWITCHED-MODE POWER SUPPLY AND ITS USE

[75] Inventor: Günther Bergk, Niedernhausen, Germany

[73] Assignee: Braun Aktiengesellschaft, Frankfurt am Main, Germany

[21] Appl. No.: 09/082,637

[22] Filed: May 21, 1998

Related U.S. Application Data

[63] Continuation of application No. PCT/EP97/01679, Apr. 4, 1997.

[30] Foreign Application Priority Data

Apr. 15, 1996 [DE] Germany .......................... 196 14 816

[51] Int. Cl.[7] .................................................. H02M 3/335
[52] U.S. Cl. ................................. 363/18; 363/19; 363/20
[58] Field of Search ................................. 363/18, 19, 20, 363/56

[56] References Cited

U.S. PATENT DOCUMENTS 4,684,871  8/1987  Plagge ........................................ 363/19
4,763,061  8/1988  Schwarz ..................................... 363/19

FOREIGN PATENT DOCUMENTS 0 162 341   5/1983   European Pat. Off. .
33 00 285   7/1984   Germany .
41 22 544   7/1992   Germany .
61-207173   2/1987   Japan .

Primary Examiner—Peter S. Wong
Assistant Examiner—Rajnikant B. Patel
Attorney, Agent, or Firm—Fish & Richardson P.C.

[57] ABSTRACT

The invention is directed to an electronic switched-mode power supply for supplying power to an electrical energy-absorbing device from an AC or DC voltage source of different voltage levels, with a primary switched-mode flyback converter which includes a transformer having its secondary winding connected in series with the electrical energy-absorbing device and a first diode, while its primary winding is connected in series with the collector-emitter circuit of a first transistor having its base connected to the one end of the secondary winding of the transformer through a feedback capacitor, the base of the first transistor being further connected to the one pole of the input voltage source, wherein several feedback capacitors are provided which, during the transformer discharge cycle, are connected to the secondary winding of the transformer, acting as parallel-connected capacitors, and which, during the transformer charge cycle, are connected to a branch comprising the base-emitter circuit of the first transistor, acting as serially-connected capacitors. The invention is suited for use in an electric shaving apparatus.

7 Claims, 1 Drawing Sheet

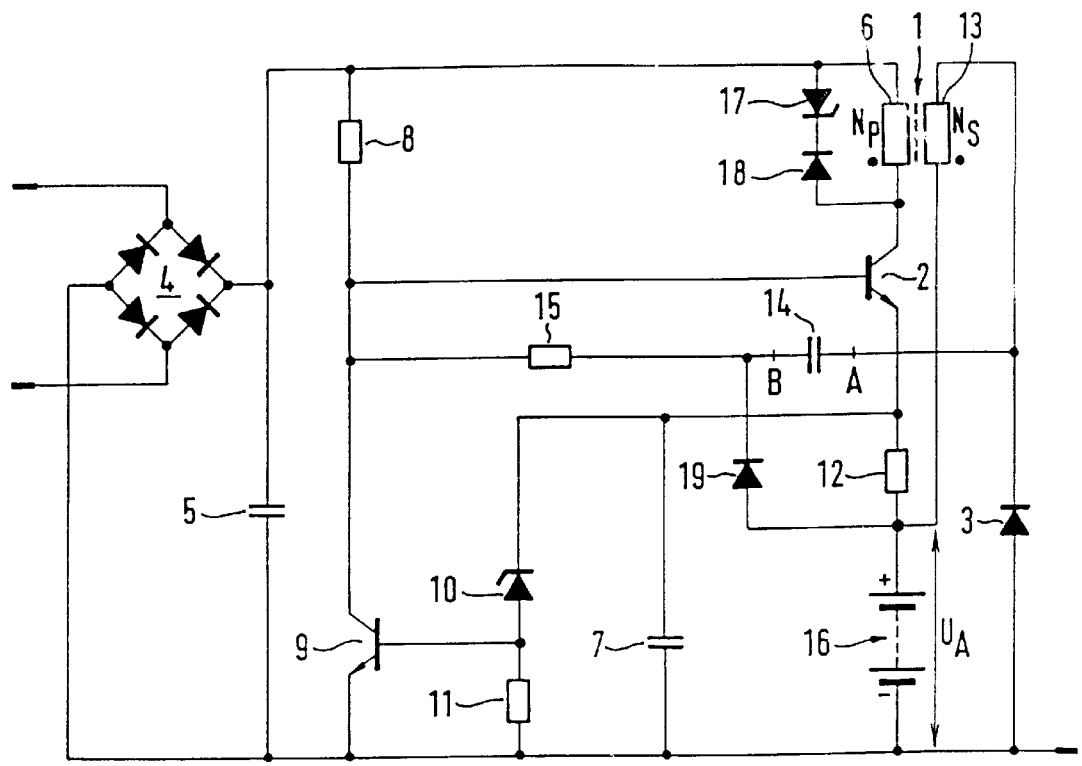
PRIOR ART FIG. 1
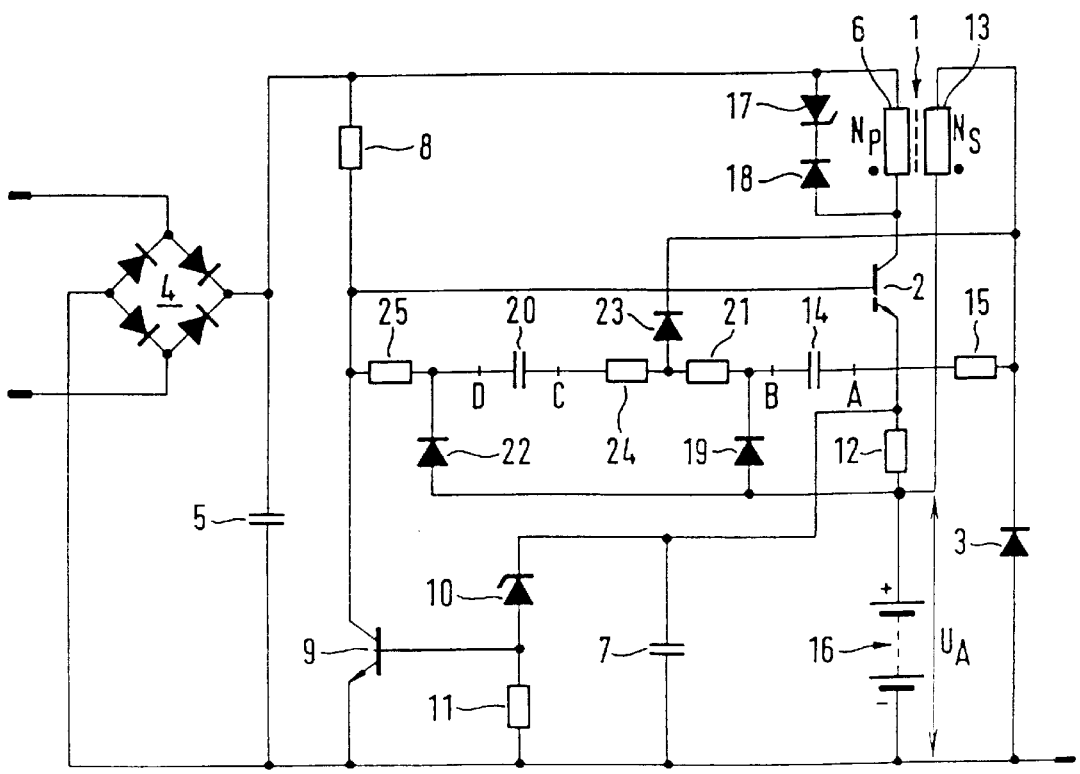
FIG. 2

ELECTRONIC SWITCHED-MODE POWER SUPPLY AND ITS USE

This is a continuation of PCT application serial no. PCT/EP97/01679, filed Apr. 4, 1997, which claims priority from German application serial number 19614816.2, filed Apr. 15, 1996, (pending).

BACKGROUND OF THE INVENTION

This invention relates to an electronic switched-mode power supply and the use of such a switched-mode power supply.

From DE-41 22 544 C1 an electronic switched-mode power supply of this type is known, being illustrated in simplified form in FIG. 1 and explained in more detail in the following. This electronic switched-mode power supply comprises a primary switched-mode flyback converter having a transformer 1, a transistor 2, and a diode 3 provided in the load circuit. The flyback converter is energized via a bridge rectifier arrangement 4 from a DC or AC supply whose voltage may be in the range of between 100 and 250 volts or also 12 or 24 volts, and whose frequency may be nearly arbitrary where an AC supply is used. The output voltage is applied to the input of the flyback converter or the electronic control and regulating circuitry through a filtering and smoothing arrangement 5 represented in this Figure only as a capacitor for the sake of simplicity.

Such a flyback converter may be used, for example, in a small appliance such as a shaving apparatus. This shaving apparatus may then be connected to supplies having different voltage values depending on the country. It is desirable in this case to be able to supply such a shaver with energy during camping trips or on board of a boat from the boat's electrical system. The voltages applied may then be 12 V DC or 24 V DC.

Connected in parallel with the DC terminals is the series arrangement comprising the primary winding 6 of the transformer 1 and the collector-emitter circuit of the transistor 2, and a capacitor 7. Connected to the base of the transistor 2 is a resistor 8 which is coupled to the positive pole of the input voltage source. In addition, the base of the transistor 2 is connected to the negative pole of the input voltage source via the collector-emitter circuit of a further transistor 9. The emitter of the transistor 2 is connected to the cathode of a Zener diode 10 having its anode connected to the base of the transistor 9 and also, through a further resistor 11, to the negative pole of the input voltage source. Moreover, the emitter of the transistor 2 is connected through a further resistor 12 to a first end of the secondary winding 13 of the transformer 1. The respective directions of winding of the primary 6 and secondary 13 of the transformer 1 are indicated by the dots shown in the Figure.

A feedback capacitor 14 is connected, through a feedback resistor 15, to the base of the transistor 2, its other side being connected to a second end of the secondary winding 13 of the transformer 1. Connected to the first end of the secondary winding 13 of the transformer 1 is the electrical energy-absorbing device. In the embodiment shown, the electrical energy-absorbing device is a storage battery 16. An electric motor, for example, which is not shown and which is energized by the storage battery by means of an On/Off switch, may be connected to this storage battery 16 when the electronic switched-mode power supply is not connected to a supply voltage. Equally, a diode 19 is provided which connects the first end of the secondary winding 13 of the transformer 1 to the junction of the feedback capacitor 14 and the feedback resistor 15.

To limit the back voltage, a circuit is provided in parallel with the primary winding 6 of the transformer 1, comprising the series arrangement of a Zener diode 17 and a further diode 18, the diodes having their respective cathodes connected to each other.

The mode of operation of the circuit arrangement of FIG. 1 may be explained in greater detail as follows. From the input voltage terminals, an initially low base current drives, through the resistor 8, the transistor 2 operating as a switching transistor. As a result of the transistor 2 turning on, a positive feedback effect occurs through the collector-emitter circuit of the transistor 2 and the primary winding 6 of the transformer 1, caused by the induced voltage resulting from the rising current in the primary winding 6 of the transformer 1. This positive feedback effect causes the transistor 2 to be driven additionally, rendering it conductive.

The collector current of the transistor 2 rises linearly. This produces a proportional voltage drop across the resistor 12. When, as a result of the rising collector current, the sum of the voltage across the resistor 12 and the voltage of the storage battery 16 reaches a value exceeding the breakdown voltage of the Zener diode 10, the transistor 9 goes into conduction.

This causes the base of the transistor 2 to be connected directly to the one terminal of the input voltage source, whereby the base current is withdrawn from the transistor 2. The transistor 2 thereby stops conducting, and current flow through the primary winding 6 of the transformer 1 is cut off abruptly.

This induces in the secondary winding 13 of the transformer 1 a voltage of a polarity that is opposite to the polarity during the interval when the transistor 2 is conducting. In respect of a current caused by this induced voltage, the diode 3 has a polarity in the forward direction. Current is thus supplied to the load (storage battery 16) during the inverse cycle until the energy stored in the transformer 1 is delivered to the load.

During the reversal process of the transformer 1, the diodes 17 and 18 connected in parallel with the primary winding 6 of the transformer 1 limit the back voltage peak.

As a result of the voltage induced across the secondary winding 13 of the transformer 1, the capacitor 14 received a positive charge on the side identified by "A" during the ON period of the transistor 2. Correspondingly, a negative charge was applied to the side of the capacitor 14 identified by "B". The diode 19 has a polarity in the reverse direction related to the voltage induced across the secondary winding 13 of the transformer 1 during the ON period of the transistor 2.

With the transistor 2 in its non-conductive state, a voltage is induced across the secondary winding 13 of the transformer 1 whose sign is precisely inverse to the voltage induced across the secondary winding 13 of the transformer 1 in the conductive state of the transistor 2.

As a result, the capacitor 14 reverses its charge during the OFF period of the transistor 2. Point B is connected to the positive voltage through the diode 19 whose polarity is in this case in the forward direction, while point A is connected to the negative voltage.

Accordingly, after the transformer 1 has delivered its stored energy, the capacitor 14 has a positive charge at point B, and correspondingly a negative charge at point A.

This voltage across the capacitor 14 supports the switching process in the subsequent switching of the transistor 2 to the conducting state, because the base-emitter current through the transistor 2 is supported by the sign of the voltage across the capacitor 14. In particular at low-level input voltages as, for example, a 12 V DC voltage, the turn-on process of the transistor 2 is supported by the sign of the voltage across the capacitor 14. Hence operation of the flyback converter is stabilized in particular at low-level input voltages.

During the subsequent conductive state of transistor 2, the capacitor is again charged as described above, receiving a positive charge at point A and a negative charge at point B.

SUMMARY OF THE INVENTION

In contrast, a switched-mode power supply according to according to the invention involves comparatively less complexity for obtaining a higher voltage on a feedback capacitor network, which acts to support the input terminal voltage when the switching transistor is rendered conducting, the transistor making it possible for current to flow through the primary winding of the transformer. This advantageously improves the switched-mode power supply in particular in cases where low supply voltages are used.

The approach according to according to the invention is of particular advantage when the emitter potential of the switching transistor is raised by a storage battery in the switched-mode power supply as described below.

A particularly advantageous configuration of an electronic circuitry is described below. This configuration makes advantageous use of the fact that the voltages induced across the secondary winding of the transformer differ during the charge and discharge cycles.

It is also described below how further capacitors may be connected in parallel during the discharge cycle of the transformer if these capacitors are to be connected to act as serially connected capacitors in particular at the beginning of the transformer charge cycle.

The use of such a switched-mode power supply is particularly advantageous in an electric shaving apparatus because its wide variety of applications is enhanced in particular where low-level supply voltages are used as during camping trips or on board of boats.

BRIEF DESCRIPTION OF THE DRAWINGS

An embodiment of the present invention is illustrated in greater detail in the accompanying drawing. In the drawing, FIG. 2 shows an electronic switched-mode power supply in which identical components performing identical functions as known from the circuit configuration of the prior art referred to in the foregoing are designated by identical reference numerals as in FIG. 1.

DETAILED DESCRIPTION OF THE INVENTION

In the circuit diagram of FIG. 2 an assembly of components has been added comprising a capacitor 20, a resistor 21, diodes 22 and 23, and a resistor 24. Moreover, another resistor 25 is provided.

Connected to point B is the one end of the resistor 21 having its other end connected to the one lead of resistor 24. The other lead of resistor 24 is connected to a lead of capacitor 20 at point C. Capacitor 20 has its other lead connected to the base of transistor 2 through resistor 25, and to the cathode of diode 22. The anode of diode 22 is connected to the one end of the secondary winding 13 of the transformer 1. The anode of diode 23 is connected to the junction of resistors 21 and 24. The cathode of diode 23 is connected to the other end of the secondary winding 13 of the transformer 1 to which capacitor 14 is also connected through resistor 15 at point A.

Accordingly, the mode of function as regards the voltage relationships may be explained as follows. While the transistor 2 was conducting, the capacitor 14 received a positive charge at the end designated as "A" because of the voltage induced across the secondary winding 13 of the transformer 1. Correspondingly, a negative charge occurred on the side of the capacitor 14 designated as "B". The diode 19 has a polarity in the reverse direction related to the voltage induced across the secondary winding 13 of the transformer 1 during the ON period of the transistor 2. Further, the capacitor 20 receives a positive charge on the side designated as "C", and correspondingly a negative charge on the side designated as "D". The diodes 22 and 23 equally have a polarity in the reverse direction related to the voltage induced across the secondary winding 13 of the transformer 1 at this particular instant. Hence at this instant the capacitors act as serially connected capacitors because the branches that would effect a parallel connection of the capacitors 14 and 20 are rendered ineffective by reason of the polarity in the reverse direction of the diodes 22 and 23.

With the transistor 2 in its non-conductive state, a voltage is induced across the secondary winding 13 of the transformer 1 whose sign is precisely inverse to the voltage induced across the secondary winding 13 of the transformer 1 in the conductive state of the transistor 2.

As a result, the capacitor 14 reverses its charge during the OFF period of the transistor 2. Point B is connected to the positive voltage through the diode 19 whose polarity is in this case in the forward direction, while point A is connected to the negative voltage. Equally, point D is connected to the positive voltage through the diode 22 whose polarity in this case is likewise in the forward direction, and point C is connected to the negative voltage through the diode 23 whose polarity is then equally in the forward direction.

After the transformer 1 has delivered its stored energy, the capacitor 14 has a positive charge at point B, and correspondingly a negative charge at point A. Equally, the capacitor 20 has a positive charge at point D and a negative charge at point C. Direct current flow through diode 19 and diode 23 "bypassing capacitor 14" is prevented by means of resistor 21. Resistors 15, 21 and 24 merely serve as current limiters during the charge reversal processes.

The voltages across capacitor 14 and capacitor 20 support the switching process in the subsequent switching of transistor 2 to the conducting state, because the voltages of capacitors 14 and 20 are additive by reason of the sign of these capacitors which act as serially connected capacitors, supporting the base-emitter current through the transistor 2. The reason why capacitors 14 and 20 act as serially connected capacitors is that the branches causing the parallel connection are rendered ineffective by the diodes 19, 22 and 23 whose polarity is then again in the reverse direction. In particular at low-level input voltages as, for example, a 12 V DC voltage, the turn-on process of transistor 2 is supported by the sign of the voltages across capacitors 14 and 20. Hence operation of the flyback converter is stabilized in particular at low-level input voltages.

During the subsequent ON period of transistor 2, capacitors 14 and 20 receive again a positive charge at points A and C, and a negative charge at point B and D, as described above.

Advantageously, therefore, the circuit arrangement is capable of producing with a specific available voltage during the transformer discharge cycle a voltage for supporting the turn-on process at the beginning of the transformer charge cycle, which voltage is greater than this specific voltage. This is accomplished in that the capacitors are charged to act as parallel-connected capacitors and are subsequently discharged acting as serially-connected capacitors. This is accomplished with a straightforward circuit configuration using diodes in those branches of the circuit that cause the parallel connection. Advantageous use is made of the fact that during the discharge cycle the voltage induced across the secondary winding 13 of the transformer 1 reverses its sign with respect to the charge cycle.

To further increase the voltage at the beginning of the turn-on period, corresponding provision may be made for further component assemblies, that is, further capacitors acting as parallel-connected capacitors during the transformer discharge cycle, and as serially-connected capacitors during the transformer charge cycle.

I claim:

1. An electronic switched-mode power supply for supplying power to an electrical load (16) from an AC or DC voltage source (4) of different voltage levels, said power supply comprising:

a primary switched-mode flyback converter which includes a first diode, a first transistor, at least two feedback capacitors, and a transformer (1) having its secondary winding (13) connected in series with an electrical energy-absorbing device and said first diode, while its primary winding is connected in series with the collector-emitter circuit of said first transistor, the base of the first transistor being connected to one pole of the voltage source, wherein during the transformer discharge cycle, said at least two feedback capacitors are connected to the secondary winding of the transformer, acting as parallel-connected capacitors, and, during the transformer charge cycle, said first transistor having its base connected to the one end of the secondary winding of the transformer through said at least two feedback capacitors, acting as serially connected capacitors.

2. The switched-mode power supply as claimed in claim 1, wherein the electrical energy-absorbing device comprises a storage battery and the electrical load connected in parallel.

3. The switched-mode power supply as claimed in claim 2, wherein the electrical energy-absorbing device is connected to that end of the secondary winding of the transformer that is not connected to any of the feedback capacitors.

4. The switched-mode power supply as claimed in claim 1 further comprising a plurality of diodes including second and third diodes; a first branch including a second diode in series with one of said at least two feedback capacitors; and a second branch including a third diode in series with another one of said at least two feedback capacitors, wherein during the transformer discharge cycle the polarity of both the second and third diodes is in the forward direction.

5. The switched-mode power supply as claimed in claim 4, wherein said at least two feedback capacitors include a first capacitor and a second capacitor, wherein said first capacitor has one side connected to a first end of the secondary winding of the transformer while its other side is connected, through a first one of said plurality of diodes, to a second end of the secondary winding of the transformer, wherein one side of the second capacitor is connected through a first resistor to the other side of the first feedback capacitor, with the one side of said second capacitor (20) being connected through a second one of said plurality of diodes to the first end of the secondary winding of the transformer, and with the other side of said second capacitor being connected through a third one of said plurality of diodes to the second end of the secondary winding of the transformer.

6. The switched-mode power supply as claimed in claim 5, wherein the one side of a third capacitor is connected through a second resistor to the other side of the second capacitor, with the one side of said third capacitor also being connected through a fourth one of said plurality of diodes to the first end of the transformer winding, and with the other side of said third capacitor being connected through a fifth diode to the second end of the transformer winding.

7. An electric shaving apparatus including the switched-mode power supply as claimed in claim 1.

* * * * *